United States Patent [19]

Faulkner et al.

[11] 4,270,899
[45] Jun. 2, 1981

[54] ROLLER GRATE MATERIAL BED TRANSPORTING AND HEAT EXCHANGE APPARATUS

[75] Inventors: Bobby P. Faulkner, New Berlin; George T. Lee, West Allis; Peter L. Schumacher, Oak Creek; Michael H. Weinecke, Greenfield, all of Wis.

[73] Assignee: Allis-Chalmers Corporation, Milwaukee, Wis.

[21] Appl. No.: 105,982

[22] Filed: Dec. 21, 1979

[51] Int. Cl.³ ............... F27B 15/00; F26B 19/00
[52] U.S. Cl. .................................. 432/58; 34/236; 193/35 R; 198/950; 432/14; 432/144
[58] Field of Search ............... 432/14, 58, 106, 138, 432/144; 34/240, 236; 198/780, 950; 193/35 R; 209/671

[56] References Cited

U.S. PATENT DOCUMENTS

| | | | |
|---|---|---|---|
| 626,202 | 5/1899 | Dula | 34/240 |
| 1,667,428 | 4/1928 | Mason | 34/236 |
| 3,518,944 | 7/1970 | Patin | 198/780 |
| 3,589,033 | 6/1971 | Bryand | 34/240 |

Primary Examiner—John J. Camby
Attorney, Agent, or Firm—Lee H. Kaiser

[57] ABSTRACT

Roller grate apparatus for simultaneously transporting and transferring heat to or from a bed of material particles has elongated cylindrical parallel horizontal rollers rotatably driven in the same direction; filler bars disposed in the nip between adjacent rollers and together with the rollers forming a generally flat surface with constantly moving portions which continually tumble the material particles and urge them thereacross in a direction transverse to the roller axes; gas passage apertures in the rollers which permit a heat transfer gas stream to pass through the rollers; a heat transfer chamber spanning the rollers; and a fan for blowing a heat transfer gas stream through the chamber and the material bed being transported by the rollers.

9 Claims, 5 Drawing Figures

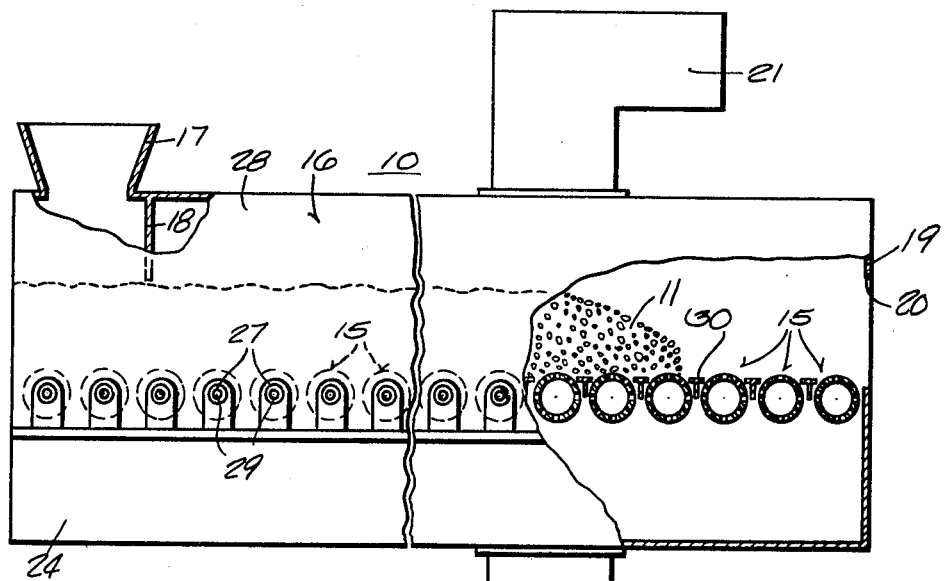
FIG. 1
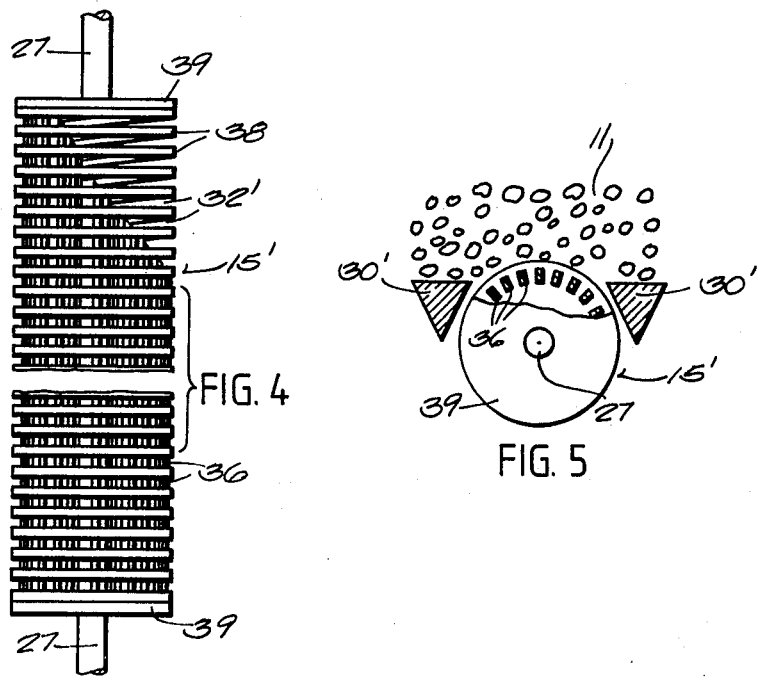
FIG. 4
FIG. 5

ROLLER GRATE MATERIAL BED TRANSPORTING AND HEAT EXCHANGE APPARATUS

This invention relates to an apparatus for simultaneously transporting and transferring heat to or from a bed of material.

BACKGROUND OF THE INVENTION

Beds of material particles are often transported during heating or cooling on a horizontal traveling grate comprising parallel grate plates, or grate bars affixed at their ends to endless chains which engage sprocket drive wheels. For example, horizontal traveling grates are used to convey beds of material in limestone, cement and iron ore indurating systems while heating or cooling gas streams are forced through a bed of material carried on the grate plates. A significant amount of heat energy is wasted as the grate plates and grate chain return. The bed of material is essentially static as it is transported by the traveling grate, and a relatively high drop exists in the pressure across the bed required to blow the heat transfer gas stream through the material. Further, relatively high horsepower motors are required to drive the traveling grate chain and the fans which force the gas streams through the material bed.

Screens for conveying and sizing material particles such as green taconite pellets are also known which comprise a series of driven, spaced-apart, parallel, screen rods, or rollers, such as disclosed in U.S. Pat. Nos. 2,988,781; 3,438,491 and 3,848,744. The rollers may be of different diameters and driven at different speeds to convey the pellets, the spacing between rollers is varied to classify the pellets according to size, and the rollers may be covered with abrasive resistant rubber, as taught in U.S. Pat. No. 3,438,491, or may have a hard chromium outer shell, as taught in U.S. Pat. No. 3,848,744, to extend the service life of the rollers. Such conveying and sizing roller screens are not adapted to simultaneously transport and transfer heat to or from a bed of material.

OBJECTS OF THE INVENTION

Accordingly, it is an object of the invention to provide improved material bed transporting and heat exchange apparatus which eliminates the heat energy lost in prior art traveling grate apparatus as the result of the grate plates and grate chain returning through the atmosphere.

It is a further object of the invention to provide apparatus for simultaneously transporting and forcing a heat transfer gas stream through a bed of material which increases the heat transfer between the material and the gas stream in comparison to prior art apparatus.

It is a still further object of the invention to provide improved material bed conveying and heat exchange apparatus which agitates the material while it is conveyed so that all surfaces of the material particles are exposed to the heat transfer gas stream and heat transfer between material and gas stream is consequently improved.

Still another object of the invention is to provide improved material bed transporting and heat exchange apparatus which continuously tumbles the material particles and significantly improves the solid-to-gas contact in comparison to traveling grate apparatus.

Another object is to provide improved apparatus for transporting a bed of material particles while forcing a heat transfer gas stream through the material wherein the pressure drop and the temperature gradient across the material bed are both significantly lower than in prior art apparatus.

A still further object is to provide improved material bed transporting and heat exchange apparatus which: (1) has lower capital cost and lower maintenance costs than traveling grate apparatus; (2) eliminates the return strand of traveling grate apparatus; and (3) uses material supporting rollers which are of less expensive material than the alloy steel grate plates of traveling grate apparatus.

Still another object of the invention is to provide improved apparatus for transporting and transferring heat to or from a bed of material which requires less space for the conveyor apparatus, permits use of lower horsepower drive and fan motors, and requires lower cost to operate such motors than prior art traveling grate apparatus.

SUMMARY OF THE INVENTION

Roller grate material bed conveying and heat exchange apparatus in accordance with the invention comprises a plurality of parallel elongated horizontal rollers mounted for rotation about their longitudinal axes; elongated filler members disposed in the nip between adjacent rollers above their longitudinal axes; drive means for rotating the rollers in the same direction; said rollers together with said filler members forming a generally horizontal surface with constantly moving portions which urge particles of said material in a direction transverse to the roller axes and continually agitate the particles; said rollers having gas passage apertures therein which permit a heat transfer gas stream to pass through the material bed conveyed on the rollers; and mean for blowing a heat transfer gas stream in a vertical direction through the material bed as it is being transported. The material particles are continuously tumbled by the rollers as they are conveyed so all surfaces of the particles are exposed to the heat transfer gas stream, thereby increasing the solid-to-gas contact and improving heat transfer between the gas stream and the material particles in comparison to prior art traveling grate apparatus and also reducing the pressure drop and the thermal gradient across the bed.

IN THE DRAWINGS

FIG. 1 is a front view, partially in section, of the drying zone of an indurating system preheater embodying the invention;

FIG. 4 is a plan view of a roller especially adapted for conveying iron ore pellets in the apparatus of FIG. 1; and FIG. 5 is a cross section view through the FIG. 4 roller installed in the FIG. 1 apparatus with filler bars of triangular cross section.

DESCRIPTION OF PREFERRED EMBODIMENTS

Figure 2:
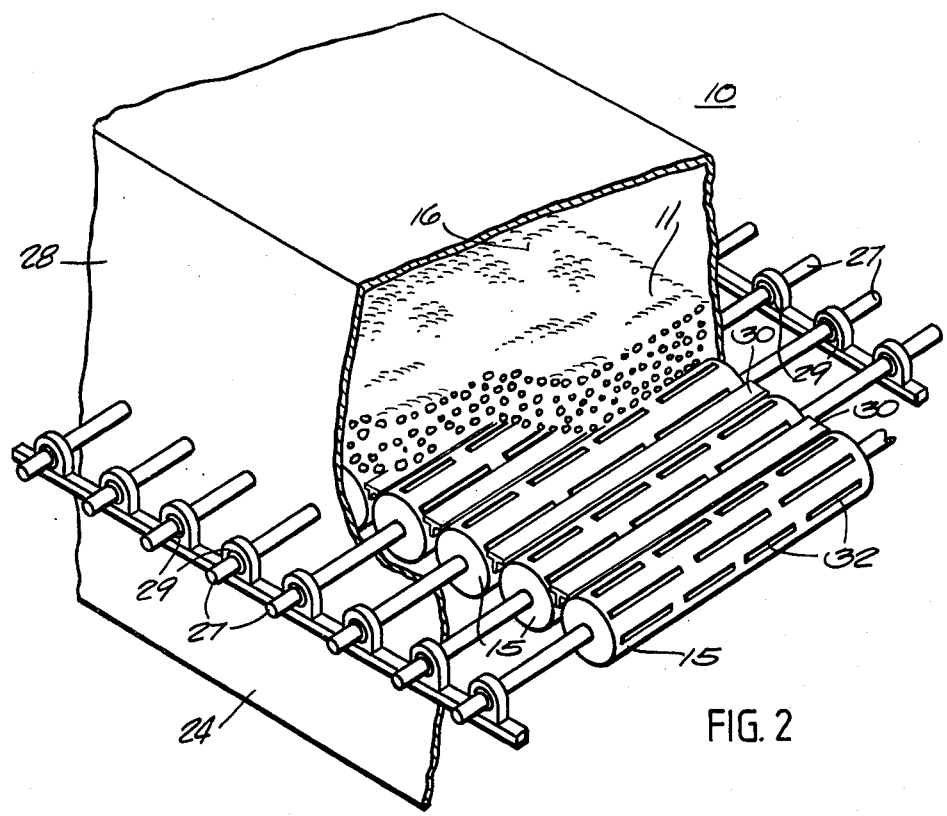
FIG. 2 is a partial perspective view of the FIG. 1 embodiment.

Referring to the drawings, FIG. 1 shows the drying zone 10 of a roller grate indurating system preheater embodying the invention adapted to simultaneously convey and transfer heat to a bed 11 of material particles such as limestone, cement, oil shale or green iron-ore pellets. Preheater drying zone 10 includes a plurality of parallel, horizontal, elongated cylindrical rollers 15 mounted for rotation about their longitudinal axes. Rollers 15 form a roller grate for material bed 11 and are enclosed within an air-tight chamber, or hood 16 which spans the plurality of rollers 15. Chamber 16 may have an inlet hopper 17 for receiving material such as iron ore pellets from a balling drum and feeding the pellets onto rollers 15, a transverse internal wall portion 18 adjacent hopper 17 which establishes the maximum depth of material bed 11, and a transverse partition 19 providing an outlet 20 through which the heated material 11 is discharged to a subsequent heat transfer zone of the indurating system such as a preburn zone. The grate plates of a traveling grate must be of a material such as high alloy steel that can withstand the hottest indurating system temperature that they move through which, for example, may be in a preburn zone. The material required for rollers 15 is dependent upon the maximum temperature in the heat transfer zone in which they are positioned, i.e., in the drying zone. Inasmuch as rollers 15 in drying zone 10 are not exposed to the hottest temperature for the indurating system, in the same manner as the grate plates of a conventional traveling grate, rollers 15 in drying zone 10 need not be of a high alloy steel, and only approximately one-third of the rollers of an iron ore pellet preheater need be constructed of high alloy steel.

A heating gas inlet duct 21 may register with hood 16 and receive hot kiln-off gases from an indurating system kiln (not shown). A motor-driven blowing fan (not shown) communicating with inlet duct 21 may, if desired, in known manner force the heated gases to pass through material bed 11. A windbox, or suction box 24 positioned beneath rollers 15 may span the plurality of rollers 15 and collect downdraft heating gases which have passed through the material bed 11 on rollers 15. A gas exhaust duct 25 may register with windbox 24, and a motor-driven suction fan (not shown) may, if desired, be disposed in exhaust duct 25 to suck the heating gases out from windbox 24.

Cylindrical rollers 15 may be attached to elongated shafts 27 which pass through the sidewalls 28 of hood 16 and are journalled at their ends for rotation about their longitudinal axes in nonfriction bearings 29 outside of the hot zone within hood 16. Suitable seals (not shown) may be provided between shafts 27 and the sidewalls 28 of hood 16, and it will be appreciated that such seals can be simpler than the sealing means required for a traveling grate wherein the grate chains pass through the heat transfer chamber. Each shaft 27 has a sprocket wheel (not shown) attached to one end for engagement with a driving chain (not shown). Drive means for a plurality of rollers are well known such as disclosed in U.S. Pat. No. 3,438,491 and are omitted in order to simplify the description. However, it will be noted that rollers 15 are closely spaced, and preferably the sprocket wheels of alternate shafts 27 are disposed adjacent opposite sides of hood 16 to provide adequate clearance. The drive means for rotating the plurality of rollers 15 at the same speed may include two drive chains, one on each side of hood 16. In alternative embodiments rollers 15 are driven by chains between adjacent rollers, and in still other embodiments certain of rollers 15 are driven at different speeds.

Elongated filler bars 30, preferably of T-shape cross-section are disposed in the nip between adjacent rollers 15 above their longitudinal axes and are affixed at their ends to sidewalls 28 of hood 16. Filler bars 30 prevent the material particles from entering the gap between adjacent rollers 15, thereby preventing the agglomerated material particles from being crushed between adjacent rollers 15 and also preventing the particles from jamming the rollers 15. The filler bars 30 have maximum resistance to bending when the stem of the T-shape cross section is disposed vertically and the cross bar thereof is disposed horizontally. In an alternative embodiment represented in FIG. 5 the filler bars 30' are of triangular cross section.

It will be appreciated that the material bed flowrate is dependent upon both the width of filler bars 30 and their position relative to the roller longitudinal axes, and further that by minimizing the width of filler bars 30 the speed of rollers 15 can be decreased to obtain the same material bed flowrate.

Rollers 15 together with filler bars 30 form a generally flat surface for material bed 11 having constantly moving portions which continuously agitate and tumble the particles in the bed and urge them toward outlet 19. In typical preheaters the length of hollow rollers 15 may be from 12 to 18 feet, and the roller diameter may vary from 4 to 12 inches depending upon the particular material being conveyed and heated. The rollers 15 deflect slightly under their own weight and the weight of the material 11, and the minimum diameter of hollow rollers which will not deflect more than an arbitrary amount, e.g., $\frac{1}{8}$ inch, at its center is approximately 6 inches for hollow rollers of 12 foot span, 8 inches for hollow rollers of 15 foot span, and 10 inches for rollers of 18 foot length. The filler bars 30 allow large diameter rollers 15 to be used since the nip angle between adjacent rollers is not of concern.

Figure 3:
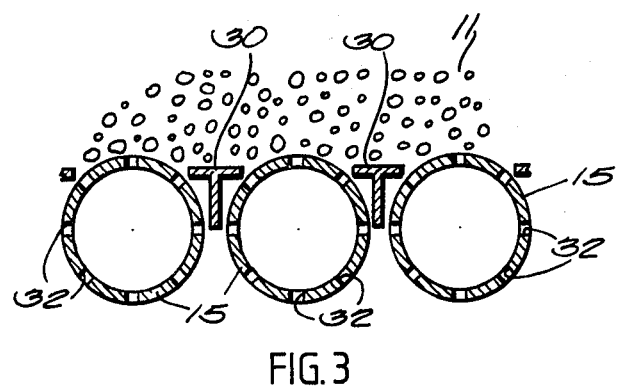
FIG. 3 is a cross section view taken through a plurality of rollers of the FIG. 1 embodiment.

Rollers 15 of drying zone 10 may be hollow and have a plurality of gas passage apertures 32 therethrough which may be of any desired configuration and are shown in FIGS. 1-3 as radially extending slots elongated in a direction parallel to the roller longitudinal axes to permit the heating gas stream to pass vertically downward through the material bed 11. In one embodiment using hollow stainless steel rollers 15 of four inch diameter, the total area of the slots 32 in each roller is approximately fifteen percent of the roller surface area, the gap between adjacent rollers 15 is approximately $\frac{1}{8}$ inch, the filler bars 30 are $1\frac{1}{4}$ inch wide, and the projected area of the slots 32 and gaps between adjacent rollers 15 is approximately 17 percent of the total surface area formed by rollers 15 and filler bars 30. Iron ore pellet beds 11 of up to ten inch depth are conveyed on this embodiment at speeds up to 200 inches per minute with roller speeds in the range of 100 to 150 rpm, and limestone beds of eight inch depth are conveyed at speeds up to 90 inches per minute at roller speeds of 145 rpm with very little degradation of the limestone.

FIGS. 4 and 5 illustrate an alternative embodiment particularly suited for conveying iron ore pellets during heating or cooling in which rollers 15' have gas passage apertures in the form of circumferential, or spiral, slots 32' in the cylindrical roller surfaces. Breakage of pellets can occur when they are caught between the axially extending slots 32 and the filler bars 30 of the FIGS. 1-3 embodiment. In contrast, the circumferential slots 32' of the rollers 15' of the FIGS. 4 and 5 embodiment have minimal slot length parallel to filler bars 30 tending to catch and break a pellet and, consequently, pellet breakage is significantly reduced.

As shown in FIGS. 4 and 5 each roller 15' preferably comprises a pair of spaced circular steel end plates 39 affixed to a shaft 27 and a plurality of elongated steel bars 36 welded in spaced relation to end plates 39 parallel to the axis of shaft 27 so bars 36 form a cylinder. A stainless steel bar 38 (for example, of 2 millimeter width) is spirally wound on top of and welded to the bars 36 with space between adjacent convolutions to provide the circumferential gas passage slots 32' between adjacent spiral turns of bar 38.

While our invention has been disclosed as embodied in a drying zone 10 of an indurating system preheater, it will be readily apparent that our invention may also be embodied in other material bed conveying and heat exchange apparatus such as preburn and cooling zone indurating apparatus.

Beds of material such as limestone, green iron ore pellets, indurated iron ore pellets, cement and oil shale can be conveyed on the disclosed roller grate material bed conveying and heat exchange apparatus at speeds equal to that typically used on traveling grates. The rotating cylindrical rollers 15 continually tumble the material bed particles and thus produce a dynamic bed in which all surface of the particles are exposed to the gas stream, in comparison to known traveling grate systems wherein the bed material remains static on the roller grate plate as the plate is moved. Such dynamic bed increases the solid-to-gas contact, improves heat transfer between material bed particles and the gas stream, and also reduces both the pressure drop and temperature gradient across the bed, in comparison to the static bed transported on prior art traveling grate apparatus.

The following Table 1 compares the pressure drop measured across a bed of indurated pellets being conveyed by apparatus embodying the invention having four inch rollers (termed "roller grate") in comparison to the pressure drop across a similar material bed being conveyed by a traveling grate (termed "traveling grate"):

The following Table 2 compares the heat transfer coefficient measured between the gas stream and beds of material being conveyed by apparatus embodying the invention having four inch rollers (termed "Dynamic Bed") in comparison to the heat transfer coefficient calculated for similar material beds being conveyed by a traveling grate (termed "Static Bed"):

TABLE 2

| | HEAT TRANSFER COEFFICIENT | | | |
|---|---|---|---|---|
| | MEASURED (DYNAMIC BED) (BTU/HR FT$^2$- °F) | CALCULATED (STATIC BED) (BTU/HR FT$^2$- °F) | AIR FLOWRATE (SCFM/FT$^2$) | BED DEPTH (IN.) |
| Fired Iron Ore Pellets | 12.7 | 9 | 218 | 3 |
| Limestone | 13.6 | 9.8 | 197 | 6 |
| Green Iron Ore Pellets | 31.9 | 15.8 | 200 | 2 |

It will be appreciated that the disclosed roller grate material bed conveying and heat exchange apparatus eliminates the large heat loss which occurs when the grate plates and chain of a typical traveling grate conveyor return through the atmosphere, which heat loss has been measured to be 15 percent of the total energy input in an iron ore pelletizing plant. It will also be appreciated that the rollers of the disclosed material bed conveying and indurating apparatus are not all exposed to the hottest temperature in the same manner that all of the grate plates of a typical traveling grate conveyor are exposed and must be made of material that can withstand the hottest temperature the grate plates will reach, and only approximately one-third of the rollers 15 of an iron ore pellet conveying and indurating preheater embodying our invention need be of high alloy steel. Still further, inasmuch as the rollers 15 remain in one position, they are exposed to a constant temperature in comparison to the temperature cycle that the grate plates and chain of a typical traveling grate undergo. Consequently the thermal stress on the rollers 15 is reduced and the life thereof is increased significantly in comparison to the same factors for the plates of a typical traveling grate conveyor.

The embodiments of the invention in which an exclusive property or privilege is claimed are defined as follows:

1. Roller grate apparatus for simultaneously transporting, agitating, and exchanging heat with a bed of discrete solid mineral particles comprising, in combination, a plurality of parallel horizontal elongated cylindrical rollers mounted for rotation about their longitudinal axes, elongated filler members disposed in the nip between adjacent rollers above their longitudinal axes, drive means for rotating said plurality of rollers in the same direction, said rollers together with said filler members forming a generally horizontal surface having continually moving portions which are adapted to agitate said particles and transport said bed across said surface in a direction transverse to the longitudinal axes of said rollers at a velocity which is a minor fraction of the circumferential velocity of said rollers, said rollers having gas passage apertures therein which permit a gas

TABLE 1

| PRESSURE DROP ACROSS BED OF INDURATED PELLETS | | | | | | |
|---|---|---|---|---|---|---|
| AVG. BED DEPTH (IN.) | ROLLER SPEED (RPM) | AIR FLOWRATE (SCFM/FT$^2$) | AIR TEMP. (°F) | TRAVELING GRATE AVG. PRESSURE DROP (IN. H$_2$O) | ROLLER GRATE AVG. PRESSURE DROP IN. H$_2$O) | % DECREASE ROLLER GRATE OVER TRAVELING GRATE |
| 5 | 65 | 159 | 75 | 0.75 | 0.61 | 19 |
| 6 | 65 | 205 | 75 | 1.24 | 1.19 | 4 | stream to pass therethrough in a direction transverse to their longitudinal axes, and means for passing a heat transfer gas stream in a generally vertical direction through said apertures and said bed while it is being transported and said particles are being agitated by said rollers.

2. Roller grate apparatus in accordance with claim 1 wherein said gas passage apertures are elongated slots extending parallel to the longitudinal roller axes.

3. Roller grate apparatus in accordance with claim 1 wherein said filler members are of triangular cross section.

4. Roller grate apparatus for simultaneously conveying, agitating and transferring heat to or from a bed of discrete solid mineral particles comprising, in combination, a plurality of parallel elongated horizontal cylindrical rollers mounted for rotation about their longitudinal axes, elongated filler members disposed between adjacent rollers above their longitudinal axes;

drive means for rotating said plurality of rollers in the same direction;

said rollers and said filler members together forming a generally horizontal surface for said bed with constantly moving portions which are adapted to agitate said particles and transport said bed thereacross in a direction transverse to the roller axes at a velocity which is a minor fraction of the circumferential velocity of said rollers;

said rollers having gas passage apertures therein which permit a heat transfer gas stream to pass through said rollers in a direction transverse to their longitudinal axes, and means including a heat transfer chamber enclosing a plurality of said rollers for passing a heat transfer gas stream in a generally vertical direction through said apertures and said bed being transported by said rollers.

5. Roller grate apparatus in accordance with claim 1 or 4 wherein said gas passage apertures comprise generally circumferential slots in the cylindrical roller surfaces.

6. Roller grate apparatus in accordance with claim 5 wherein each said roller includes an elongated member wound helically to form a portion of the cylindrical roller surface with the space between adjacent helical convolutions forming said generally circumferential gas passage apertures.

7. Roller grate apparatus in accordance with claim 1 or 4 wherein said filler members are of T-shape cross-section with the stem thereof extending vertically.

8. Roller grate apparatus in accordance with claim 1 or 4 wherein said heat transfer chamber has opposed sidewalls disposed adjacent the opposite ends of said rollers transverse to their longitudinal axes and said rollers are affixed to elongated shafts which extend through said sidewalls and are mounted for rotation in bearings external of said heat transfer chamber.

9. Roller grate apparatus in accordance with claim 1 or 4 wherein said filler members between adjacent rollers have flat upper surfaces generally parallel to a plane intersecting the axes of said adjacent rollers and positioned below the uppermost surfaces of said adjacent rollers.

* * * * *